July 2, 1935.  L. COHEN ET AL  2,007,076
LANDING FIELD LOCALIZER
Filed June 3, 1929  2 Sheets-Sheet 1
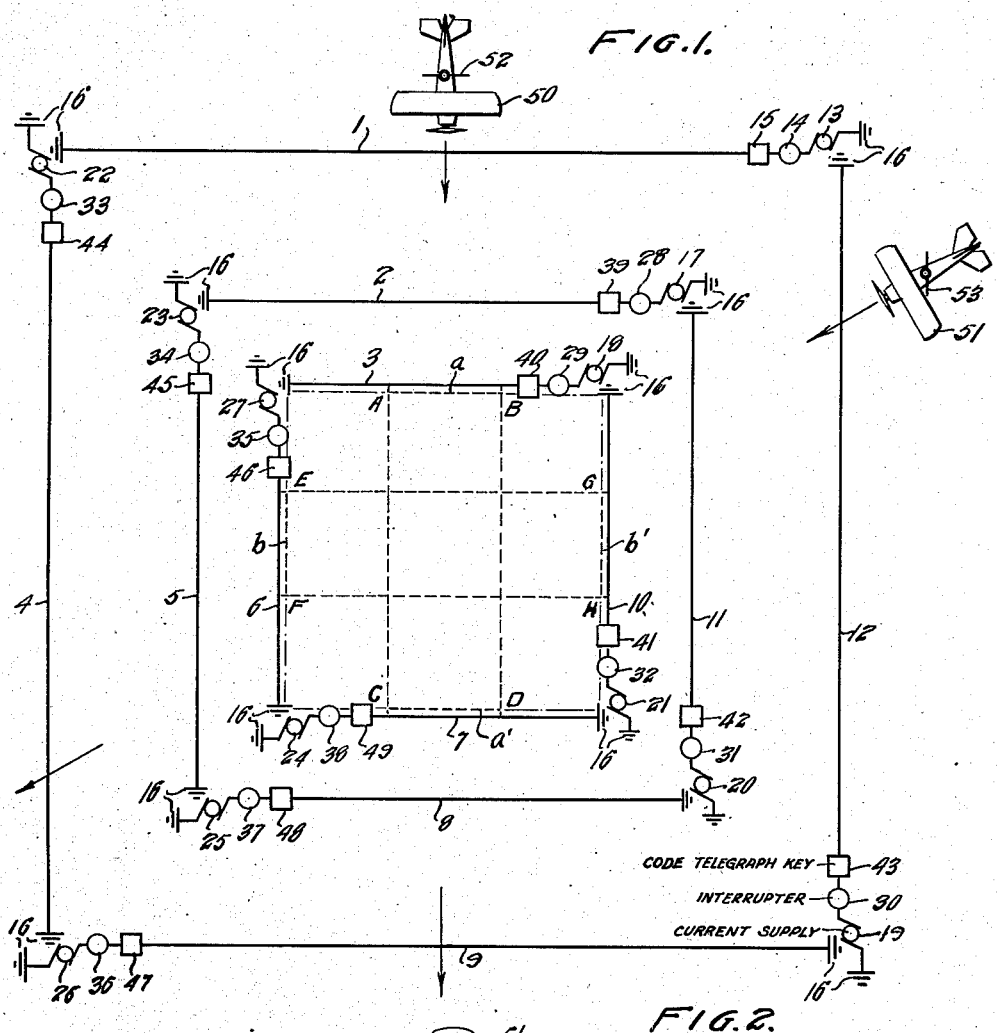
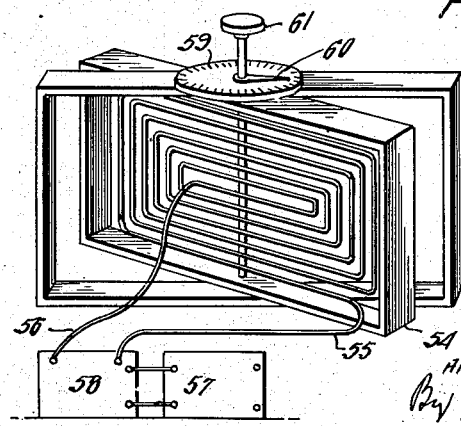
Inventor
LOUIS COHEN,
JOSEPH I. McMULLEN
AND JOSEPH O. MAUBORGNE July 2, 1935.  L. COHEN ET AL  2,007,076
LANDING FIELD LOCALIZER
Filed June 3, 1929  2 Sheets-Sheet 2
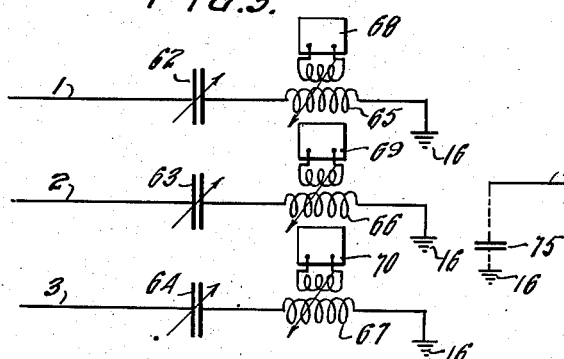
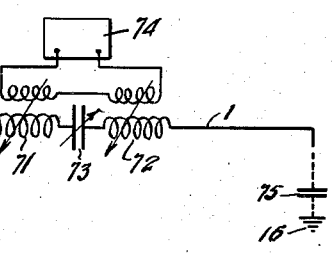
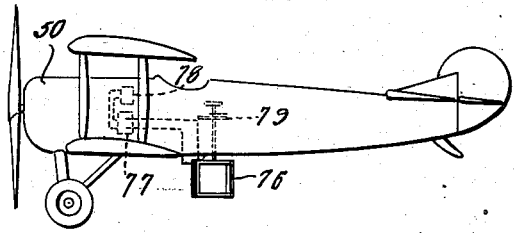
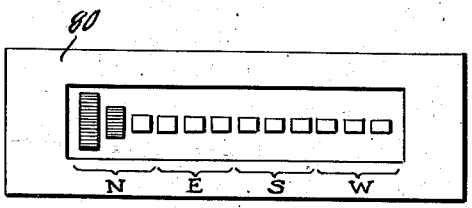
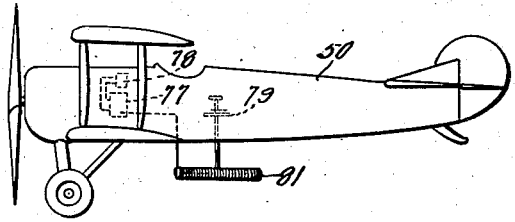
Inventor
LOUIS COHEN,
JOSEPH I. McMULLEN
AND JOSEPH O. MAUBORGNE.

Patented July 2, 1935

2,007,076

UNITED STATES PATENT OFFICE 2,007,076

LANDING FIELD LOCALIZER

Louis Cohen, Joseph I. McMullen, and Joseph O. Mauborgne, Washington, D. C.

Application June 3, 1929, Serial No. 368,170

10 Claims. (Cl. 177—352)

This invention relates in general to landing field localizers employing signaling devices and more particularly has reference to a method and apparatus for determining landing locations from aircraft.

Previous to this time, radio beacons have been provided for aiding a pilot in reaching an approximate destination. Under conditions of poor visibility, however, guidance of this character have not proved of any material advantage in aiding in the safe descent of a craft to the exact landing area.

This invention consists in general of placing a plurality of separate conductors particularly spaced in parallel relation about the edges of a suitable landing area, transmitting separate currents of different characteristics through each individual conductor, and detecting, and distinguishing certain of the currents set up either visually or audibly from an aircraft whereby the location of the field and the direction of flight may be determined by the pilot in discriminating between the different signals.

An object of this invention is to provide a method and apparatus whereby aircraft approaching an air port may be guided directly to the landing area.

Another object of this invention is to provide a method and apparatus whereby an aircraft over the landing area of an airport may be directed in a proper course for landing.

A further object of this invention is to provide a method and apparatus which may be utilized in connection with high or low frequency alternating current or interrupted direct current systems.

With these and other objects in view which may be incident to our improvements, the invention consists in the parts and combinations to be hereinafter set forth and claimed, with the understanding that the several necessary elements comprising our invention may be varied in construction, proportions and arrangement without departing from the spirit and scope of the appended claims.

In order to make our invention more clearly understood, we have shown in the accompanying drawings means for carrying the same into practical effect, without limiting the improvements in their useful applications to the particular constructions which, for the purpose of explanation, have been made the subject of illustration.

In the drawings forming a part of this specification:

Figure 1 is a diagrammatic view of the landing field of an airport showing the system of conductors forming the subject matter of this invention, in which direct currents are employed.

Figure 2 is a diagrammatic view of one form of a receiving system for installation on aircraft.

Figures 3 and 4 are diagrammatic views of circuits showing the arrangement for the use of high frequency currents on the wires.

Figure 5 is a perspective view showing a receiving arrangement suitable for the reception of high frequency currents.

Figure 6 is a front view showing one form of indicating instrument.

Figure 7 is a perspective view showing a modification of the receiving arrangement in which a resonance wave coil is used as a pick-up coil.

Referring more particularly by numerals to the drawings and more especially to Figure 1, there is shown a landing field bounded by the dotted lines a, a', b, b'. The landing areas proper are the rectangles A, B, C, D or E, F, G, H, either of which will be used depending upon the direction of the wind near the surface of the earth.

A multiplicity of separate parallel wires suitably spaced is placed outside of and parallel to each edge of the landing area. For the purpose of illustration, only three wires on each side of the landing area are shown. The wires on one side are indicated by 1, 2 and 3; the wires on the second side of the field by 4, 5 and 6; the wires on the third side of the field by 7, 8 and 9; and those on the fourth side of the field by 10, 11 and 12.

Each individual wire is separately provided with a direct current source, an interrupter and a signaling device. The description is confined to the arrangement of one wire only; the same devices being similarly connected in each of the other wires. The circuit of the wire 1 comprises a direct current source 13, an interrupter 14, a signaling device 15, and grounds 16, at either end thereof. The direct current source 13, sets up a current flow in wire 1 which is intermittent in character because of the interruptions effected by the device 14, which imparts a distinctive character to the current, determined by the frequency of the interruptions.

A separate direct current source is provided in each of the wires as at 13, 17, 18, 19, 20, 21, 22, 23, 24, 25, 26, 27, and likewise separate interrupters 14, 28, 29, 30, 31, 32, 33, 34, 35, 36, 37, 38, which are adjusted differently so as to produce in each wire an intermittent current of a different character. The signaling device 15, in circuit with the wire 1 may be in the form of an automatic telegraph key or other device, for continuously transmitting a characteristic signal, so that a signal of definite pitch and character is continuously emitted. The remaining signaling devices 39, 40, 41, 42, 43, 44, 45, 46, 47, 48, 49, are arranged each to produce signals of different characters.

The current intensities in corresponding wires of the groups on the four sides of the landing field are the same, as for example 1, 4, 9 and 12. The current intensities in the wires of any single group on any side, as 1, 2, and 3 however, are different. The character of the currents which is determined by the frequency of interruption is also different for each of the twelve wires shown.

By this arrangement, with a suitable receiving apparatus, the interrupted direct current signals may be detected by an aircraft approaching the landing field from any direction as the same passes over the wires surrounding the field emitting signals of different characteristics and thus the side of the field which the craft is flying over as well as the direction of flight ascertained, by manipulation of a directional coil to be later described.

The signaling devices, shown by boxes 15, 39, and 40 in the wires 1, 2 and 3, and corresponding signaling devices in the wires on the other three sides of the field, may be of any suitable type. For auditory signals each may be designed to emit a combination of dots and dashes or other characteristic auditory signals which will be recognized by the aviator as the signal characteristic of the particular wire. If a visual indication is desired, any suitable equipment, such for example, as a vibrating reed instrument, may be employed, in which instance the signaling devices could be eliminated from all the wires.

It is sufficient in such installations to provide an instrument on the aircraft having a number of indicating elements, such as vibrating reeds, each one of which responds only to one of the frequencies of the intermittent or low frequency currents in the wires, thus discriminating between the signals in the various wires.

It is also to be noted in this connection that low frequency current may be introduced in the several individual wires and the direct current sources and interrupters also dispensed with. In installations of this character the signal characteristics of each wire will also be different, likewise using signaling devices already described with reference to interrupted direct current system.

For illustration there are depicted two airplanes 50 and 51 shown approaching the landing field, having an interrupted direct current or low frequency installation. These airplanes are provided with direction finding coils 52 and 53 for picking up the signal emanating from the several sets of separate wires surrounding the field.

A flat spiral coil 54 corresponding to the coils 52 and 53 is shown in Figure 2 in greater detail. The coil is adapted to be mounted either within the aircraft or suspended from it and by induction is adapted to pick up energy from the successive wires on the landing field as the aircraft passes over the same.

The terminal wires 55 and 56 of the coil are connected to a suitable indicating instrument 57 which responds differently to the currents induced in coil 54, by the magnetic field of the currents in the field wires which are characterized by different frequencies, or by a combination of different signals and frequencies.

Between the terminal wires 55 and 56 of the coil and the indicating instrument 57 a suitable vacuum tube amplifier 58, or other type of amplifier may be interposed so that the signal intensities may be increased so that a more distinct reception of the signal may be secured.

The coil 54 is adapted to be oriented with respect to the direction of the field wires. The angular position of the coil 54 is observed on a scale 59 with reference to a pointer 60. Turning of the coil is effected by a knob 61 controlled within the aircraft or remotely operated by any suitable means.

In rotating the coil the same may be positioned parallel to the field wires to afford the maximum intensity of reception and the relative course of the aircraft with respect to the particular field wire ascertained by inspection of the position of the pointer on the scale. It will be appreciated that in leveling off for landing the longitudinal axis of a plane should be in line with the direction of flight. It will be readily apparent that if the longitudinal axis of a plane is angularly disposed in relation to the direction of flight the landing gear will be similarly out of line and that on contact with the ground disastrous results such as taking off the landing gear or ground looping are apt to occur.

In accordance with this invention the directional relation of the longitudinal axis of a plane to the source of the signal is determined by rotating the coil and correcting for any angular deviation from 180° if such exists. The utility of the several groups of wires will be apparent, as in passing over the several groups of signals a pilot will be able to check his course so as to allow very little possibility of error.

The indicating device 57 may be in the form of a vibrating reed instrument comprising a number of reeds adjusted for resonance with the different frequencies of the currents in the field wires. With an instrument of this character on the aircraft either one or more of these vibrating reeds will respond depending upon the height of the aircraft, spacing of the wires and the relative intensities of the current in the wires.

A telephone receiver, in which the signals emitted by the field wires are made audible, and are differentiated either by the difference in pitch or the combination of dots and dashes or other characteristic signals transmitted from each individual wire, may be substituted for the reed instrument.

In using a vibrating reed indicator, the reed which is adjusted for resonance with the frequency of the current in the extreme outer wire will be the first to respond, and as an aircraft approaches in descent to the landing field, other vibrating reeds will be brought into action which are in resonance with the frequencies of the currents in the successive wires. If the field is approached on a line coincident with the diagonal, the corresponding reeds in each series will, of course, vibrate to inform a pilot with respect to his location and the relation of his direction of flight to a particular boundary of a landing field. The advantage to be obtained in using an indicator of this character is that the reeds do not operate unless a current of certain intensity is received.

As successively reduced current intensities in successive wires are employed, an aircraft will be brought down to pick up sufficient current intensity from the different wires to operate successive reeds in the indicating instrument so that ultimately the craft will be positioned near the ground and flying in a direction suitable for landing. When a telephone receiver is used as an indicating instrument, an aircraft approaching in descent toward the landing will be guided by the frequency characteristics of the signals as well as by the intensities of the same.

A suitable vibrating reed instrument 80 is shown in Figure 6. Twelve separate reeds, each one of which is adjusted to respond to a different signal frequency emitted by one of the wires, are employed. The reeds are so arranged that the first three marked N respond respectively and successively to the signals of the three wires located on the north side of the field, the second three reeds lettered E, responsive respectively and successively to the signals of the three wires on the east side of the field, the third three reeds designated S, responsive respectively and successively to the signals of the three wires on the south side of the field, and the last three reeds grouped under W, responsive respectively and successively to the signals of the three wires on the west side of the field.

In this manner a visual indication may be had from within an aircraft of the relation of the same with respect to the landing field as the wires are passed over in succession. Also, the direction of the craft with respect to the boundaries of the landing area may be observed by reference to position of the pointer 60 carried by the coil 54 on the scale 59. The additional information concerning the direction of the wind on the ground may be given to the pilot by radio, so that he is advised by the signals emitted from wires how to orient the plane in order to land in the proper direction.

The operation of this device will be readily understood with reference to Figure 1. In providing different current intensities in the field wires in the manner described, an airplane, as 50 or 51, or other aircraft, nearing a landing field will first receive an indication from the extreme outer wire, and it is desirable that the current intensity in that wire should be sufficient to register a signal in the aircraft receiver when the same is at a considerable height above the wire. Upon approaching the outer wire for the first time on a given course, the pilot would vary the position of his pick-up coil, 53, Figure 1, to determine his angle of approach to the outer wire.

The aviator would then proceed across the field on the same course until he had picked up the signal of the outer wire on the opposite side of the field, in order to check his observation as to his angle of approach, after which he would orient himself to place his craft on a proper course for landing with respect to direction of the wind which had been signaled to him from the ground.

After the pilot has oriented himself and as the aircraft approaches more closely toward the landing field, the pilot is guided in his descent by the signals from the succeeding wires in which the signals are of successively lower intensity. By this arrangement, a funnel location method is provided, that is, signals of different character are made evident to a pilot in approaching in descent to a landing field. In nearing the extreme outer wire, a pilot is also able to orient the position of the aircraft by the adjustment of the pick-up coil 52 or 53 in Figure 1, or 54 in Figure 2, until the aircraft is brought in proper relation to the course that is desired to pursue in approaching the landing field so as to land into the wind. The signals in the different wires thus afford a means to the aviator for guiding him in his approach and descent to the landing field. It will also be manifest from the above that an approximate estimate of the altitude may be had by correlating the decreasing intensities of the signals emitted by the successive wires on a suitable indicating instrument.

Radio as well as audio frequency currents may be employed as will be noted with reference to the arrangement shown in Figure 3, in which a system of wires for only one side of the field is shown. It is to be understood that it is intended to install similar systems of wires with properly associated circuits which are similarly arranged for each of the other three sides of the landing field, in the manner as shown in Figure 1.

In Figure 3, three wires 1, 2 and 3 are shown on one side of the field, a a' and b b', each of which wires is connected in series with a variable condenser 62, 63 and 64, respectively, variable inductances 65, 66 and 67, respectively, and ground terminals 16, the other end of the wires being open. High frequency transmitters 68, 69 and 70, associated with suitable modulating means, are coupled to the three wire circuits 1, 2 and 3, respectively. Any of the conventional modes of generating the high frequency oscillations, and any of the usual methods for modulating these high frequency oscillations either telephonically, telegraphically, or otherwise, may be utilized.

It is intended that all the transmitters which act on the various wires on all sides of the landing field, operate on the same frequency, but that each of the transmitters be modulated to impart a different character to the signals. If telephonic modulation is employed, different telephonic signals may be employed to distinguish each of the wires. If the same radio frequency is used for all the transmitters, only a single receiver on the aircraft is required to receive the signals from all of these wires without any variation in adjustment. Also, as signals of a different character are emitted from each of the wires, the signals emitted from the different wires are differentiated between.

The intensities of the oscillatory currents in the wires may be either the same or different. This may be accomplished by varying the couplings between the transmitters and the respective wires with which they are associated, or by the adjustment of the power output of each of these transmitters, or by a combination of the two, or in any other suitable manner. It is preferable, however, that the intensity of the oscillatory currents in the outer wires should be of the highest value, and that the current intensities should decrease successively in the different wires as the actual landing field proper is approached. The corresponding wires on the opposite sides of the field, however, should have the same relative current intensities, thus affording a funnel arrangement for landing field localization as described in connection with Figures 1 and 2, except that receiving means suitable for high frequency currents must be employed in place of the audio frequency apparatus hereinbefore described.

A modification of the arrangement shown in Figure 3 is shown in Figure 4 in which the transmitters are coupled to the center part of each wire. In any one wire, for example 1, I twoinductance coils 71 and 72, and a variable condenser 73 are connected in the center of the wire. The transmitter 74 is coupled to the two coils 71 and 72. The two ends of each wire may be either left open or grounded through two separate condensers 75 and 75, or under suitable conditions, grounded directly.

It is to be understood that each transmitter is associated with a suitable modulator in accordance with the description in connection with Figure 3. The difference between the arrangements shown in Figures 4 and 3 consists only in applying in Figure 4 the high frequency oscillatory energy to the center of each of the wires, rather than to one terminal of the wire as shown in Figure 3.

The arrangement used for receiving the high frequency signals emitted from the wires on the landing field on an airplane 50, for example, is shown in Figure 5. A loop antenna 76 is suspended from the airplane or may be placed within the fuselage or at any other suitable location, and the same connected to a suitable receiver 77, which is provided with a suitable amplifier and suitable indicating means. The indicating device 78 may be a vibrating reed instrument as heretofore described, or a radio telephone receiver, in which the signals emitted from the different wires are made audible and distinguishable, or any other suitable form of indicator. The loop antenna 76 is mounted in a matter to be rotatable about its vertical axis, the rotation of which is accomplished by a handle 79, or other suitable means. The adjustment of the position of the loop antenna 76 is for the purpose of obtaining the best signal intensity from the wires and for determining the course of the plane in crossing the wires towards the landing courses proper, as described in connection with Figures 1 and 2.

A resonance wave coil antenna consisting of a number of turns wound in the form of a long coil and properly adjusted for response to the particular signal frequency which is to be received, may be employed in place of the loop. A coil 81 of this type is shown in Figure 7 connected at one point to the receiver 77 which is associated with a suitable indicating instrument 78. The resonance wave coil 81 is mounted so that its axis is parallel to and so that it can be rotated in a plane substantially parallel to the plane of the wings. This form of antenna is well adapted for the purpose in that a highly efficient energy collector is not required, and this wave coil antenna because of its high selectivity and because of its directional properties is very suitable for use in connection with landing field localization. This instrument is operated in the same manner as has already been described with reference to the loop 76.

In the several figures only three wires on each side of the field have been illustrated, and vibrating reed instrument comprising only twelve reeds corresponding to the signals emitted from the twelve wires placed around the field described as a suitable receiving device, but it is to be understood that no fixed limitation is placed on the number of wires that may be employed and the corresponding number of reeds that may be required. These would depend upon the matter of field space available, and also upon other practical considerations that would have to be met in an installation of this character.

The wires may be located either under or on the surface of the ground, or even at some height above the same. Since the wires are to be located outside the landing courses proper, and since it is generally required in every good landing field that there should be considerable vacant and clear space surrounding the landing field, the placing of these wires around the field will not produce any considerable hazard or obstacle to landing in the field proper.

There is accomplished by this invention a method and apparatus whereby aircraft approaching an air port under conditions of poor visibility may be guided directly to a landing area and directed in a proper course for landing, utilized in connection with high or low frequency or interrupted direct current systems.

While we have shown and described the preferred embodiment of our invention, we wish it to be understood that we do not confine ourselves to the precise details of construction herein set forth, by way of illustration, as it is apparent that many changes and variations may be made therein, by those skilled in the art, without departing from the spirit of the invention, or exceeding the scope of the appended claims.

We claim:

1. A method of directing the landing of aircraft in fog, comprising transmitting separate signals of different characteristics along each side of a landing area to identify the directional boundaries thereof, and detecting and distinguishing the character and direction of the signal over which the aircraft is flying to indicate to a pilot the location and direction of flight of the aircraft with respect to the source of the signal, thereby to orient the pilot with respect to the location and direction of flight of the aircraft in relation to the landing area.

2. A method of directing the landing of aircraft in fog, comprising transmitting a plurality of parallel groups of spaced signals of different characteristics along each side of a landing area, the signals in each group being of successively lower intensity toward the landing area to identify the directional boundaries thereof, detecting and distinguishing the character, direction and intensity of the signals over which the aircraft is flying to indicate to a pilot the location and direction of the flight and altitude of the aircraft with respect to the source of the signal thereby to orient the pilot with respect to the location and direction of flight of the aircraft in relation to the landing area, and checking the finding on the reception of successive signals toward a landing with respect to the character and direction of the signals to check on the location and direction of flight, and the diminishing intensity of the successive signals for losing altitude to bring the aircraft in for a landing on the area.

3. An apparatus for directing the landing of aircraft in fog, comprising means to transmit separate signals of different characteristics along each side of a landing area to identify the directional boundaries thereof, and means to detect and distinguish the character and direction of the signal over which the aircraft is flying to indicate to a pilot the location and direction of the flight of the aircraft with respect to the source of the signal thereby to orient the pilot with respect to the location and direction of flight of the aircraft in relation to the landing area.

4. An apparatus for directing the landing of aircraft in fog, comprising means to transmit a plurality of parallel groups of spaced separate signals of different characteristics along each side of a landing area to identify the directional boundaries thereof, the signals in each group being of successively lower intensity toward the landing area, and means to detect and distinguish the character, direction and intensity of the signal over which the aircraft is flying to indicate to a pilot the location, direction of flight, and altitude of the aircraft with respect to the signal thereby to orient the pilot with respect to the location and direction of flight of the aircraft in relation to the landing area, the subsequent reception of successive signals being adapted to afford a check of the finding on the first signal with respect to the character and direction of the signal, the reception of signals of successively lower intensity affording a guide for the pilot to lose altitude for landing on the area.

5. An apparatus for directing the landing of aircraft in fog, comprising separate radio antenna along each side of a landing area for transmitting signals of different characteristics to identify the directional boundaries of the area, and means to detect the signal over which the aircraft is flying to indicate to a pilot the location of the aircraft with respect to the antenna thereby to orient the pilot with respect to the location and direction of flight of the aircraft in relation to the landing area.

6. An apparatus for directing the landing of aircraft in fog, comprising separate radio antenna along each side of a landing area for transmitting signals of different characteristics to identify the directional boundaries of the area and means to detect and distinguish the character and direction of the signal over which the aircraft is flying to indicate to the pilot the location and direction of the flight of the aircraft with respect to the location and direction of the antenna thereby to orient the pilot with respect to the location and direction of flight of the aircraft in relation to the landing area.

7. An apparaus for directing the landing of aircraft in fog, comprising means to transmit separate radio signals of different characteristics along each side of a landing area to identify the directional boundaries thereof, a radio detector on the aircraft to directionally detect and distinguish the signal over which the same is flying to indicate to a pilot the location and the direction of flight of the aircraft with respect to the source and direction of the signal thereby to orient the pilot with respect to the location and direction of flight of the aircraft in relation to the landing area.

8. An apparatus for directing the landing of aircraft in fog, comprising means to transmit a plurality of parallel groups of spaced separate radio signals of different characteristics along each side of a landing area to identify the directional boundaries thereof, the signals in each group being of successively lower intensity toward the landing area, and a radio receiver to detect and distinguish the character and direction and intensity of the signal over which the aircraft is flying to indicate to a pilot the location, direction of flight and altitude of the aircraft with respect to the source of the signal thereby to orient the pilot with respect to the location and direction of flight of the aircraft in relation to the landing area, the subsequent reception of successive signals being adapted to afford a check on the finding of the first signal with respect to the character of the signal and the direction of flight of the aircraft in relation thereto, the reception of signals of successively lower intensity being adapted to afford a guide for the pilot to lose altitude for bringing the aircraft to a landing on the area.

9. A landing area having apparatus installed along each side thereof for transmitting signals of different characteristics to identify the directional boundaries thereof, for detection on aircraft flying in fog.

10. A landing area having separate groups of parallelly arranged apparatus installed along each side thereof for transmitting radio signals of different characteristics to identify the directional boundaries thereof and different intensity for reception on aircraft so that the aircraft may lose altitude in accordance therewith for landing.

LOUIS COHEN.
JOSEPH I. McMULLEN.
JOSEPH O. MAUBORGNE.